United States Patent
Frazier et al.

(10) Patent No.: US 8,458,428 B2
(45) Date of Patent: Jun. 4, 2013

(54) METHOD OF ALLOCATING STORAGE SPACE FROM STORAGE DEVICES WITHIN A COMPUTER SYSTEM

(75) Inventors: Peter Ian Frazier, Princeton, NJ (US); Donn Harold Holtzman, San Diego, CA (US); John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 750 days.

(21) Appl. No.: 11/669,355

(22) Filed: Jan. 31, 2007

(65) Prior Publication Data

US 2007/0180212 A1    Aug. 2, 2007

Related U.S. Application Data

(60) Provisional application No. 60/763,942, filed on Jan. 31, 2006.

(51) Int. Cl.
G06F 12/00 (2006.01)

(52) U.S. Cl.
USPC ............................ 711/170; 711/114; 711/156

(58) Field of Classification Search
None
See application file for complete search history.

(56) References Cited

U.S. PATENT DOCUMENTS 7,073,025 B2 *   7/2006   Okamoto et al. ............. 711/114

* cited by examiner

*Primary Examiner* — Shawn X Gu
(74) *Attorney, Agent, or Firm* — James Stover

(57) ABSTRACT

A method and system for allocating storage space from storage devices within a computer system. The storage devices are grouped into respective homogeneous sets in which identical storage devices are included in the same homogeneous set. In accordance with the method and system, following receipt of an allocation request for storage space one or more stored response values are checked, the response values associated with at least one homogeneous set. The stored value or values represent the average response time of storage devices within the set. The homogenous set with the lowest average response time is selected. One or more stored allocation values are then checked that are associated with at least one storage device within the selected homogeneous set. The stored allocation value or values represent the current allocations of the associated storage device. The storage device is selected with the lowest current allocations and the storage space is allocated in the first available location on the selected device.

22 Claims, 3 Drawing Sheets

| SET_ID | SET_RESP | ... | ... |
|--------|----------|-----|-----|
|        |          |     |     |
|        |          |     |     |
| ...    | ...      | ... | ... |
|        |          |     |     |

FIG. 2

METHOD OF ALLOCATING STORAGE SPACE FROM STORAGE DEVICES WITHIN A COMPUTER SYSTEM

BACKGROUND

Computer systems generally include one or more processors interfaced to a temporary data storage device such as a memory device and one or more persistent data storage devices such as disk drives. Each disk drive generally has an associated disk controller. Data is transferred from the disk drives to the disk controller and is then transferred to the memory device over a communications bus or similar.

Where there are multiple data storage facilities or devices a file system must allocate space on one or more of the data storage facilities to satisfy the request. File systems have many choices of data storage device from which to allocate space. Some choices of allocation provide better I/O (input/output) performance than other choices. It is important to allocate storage in a way that maximizes I/O performance.

In a parallel shared nothing environment, one existing allocation technique makes new allocations of space from the storage device with the least number of existing allocations. It is assumed for such an allocation that all data storage device configurations are homogeneous in the sense that all storage devices in the system are identical in terms of their performance.

The I/O requests associated with a particular task are issued in parallel and all of these I/O requests must complete before the task can complete. If a task issues 100 queries in parallel by issuing 99 queries to fast devices and one query to a slow device, the task will have to wait for that one slow device to complete its I/O operation even if the other 99 I/O operations completed much earlier. All devices are made effectively as slow as the slowest device and so it is important for such a configuration that the devices are identical.

A relaxation of the homogeneous storage requirement would provide managers of the above system with greater flexibility. If more storage space is required but the storage device type for which the system is currently configured is too expensive, heterogeneous storage would enable the purchasing of only enough storage to meet the additional requirement. If homogeneous storage were required, all the old storage devices would have to be replaced with new storage devices at great cost. Heterogeneous storage has the potential to increase the flexibility available to customers in meeting their storage requirements.

SUMMARY

Described below is a method of allocating storage space from storage devices within a computer system. The storage devices are grouped into respective homogeneous sets in which identical storage devices are included in the same homogeneous set.

The method includes the step of receiving an allocation request for storage space. One or more stored response values are checked, the response values associated with at least one homogeneous set. The stored value or values represent the average response time of storage devices within the set. The homogenous set with the lowest average response time is selected. One or more stored allocation values are then checked that are associated with at least one storage device within the selected homogeneous set. The stored allocation value or values represent the current allocations of the associated storage device.

The storage device is selected with the lowest current allocations and the storage space is allocated in the first available location on the selected device.

Also described below is a method of selecting, from a plurality of groups of storage devices within a computer system, a group of storage devices for allocating storage space. Once again the groups of storage devices represent respective homogeneous sets in which identical storage devices are included in the same homogeneous set. The method includes the step of checking one or more stored or response values associated with at least one homogeneous set. The stored value or values represent the average response time of storage devices within the set. The homogeneous set is selected with the lowest average response time.

Also described is a method of monitoring the response time of a homogeneous set of identical storage devices within a computer system. An accumulator is maintained that is associated with the set. A request to write to or read from a selected one of the storage devices within the homogeneous set is received. The response time of the selected device is added to the accumulator. A response value is periodically calculated at least partly from the accumulator, the response value indicative of the response time of the homogeneous set.

Also described are related systems and computer programs for monitoring the response time of a homogeneous set of identical storage devices within a computer system.

BRIEF DESCRIPTION OF THE DRAWINGS

FIG. 2 is an example table showing stored response values.

DETAILED DESCRIPTION

Figure 1:
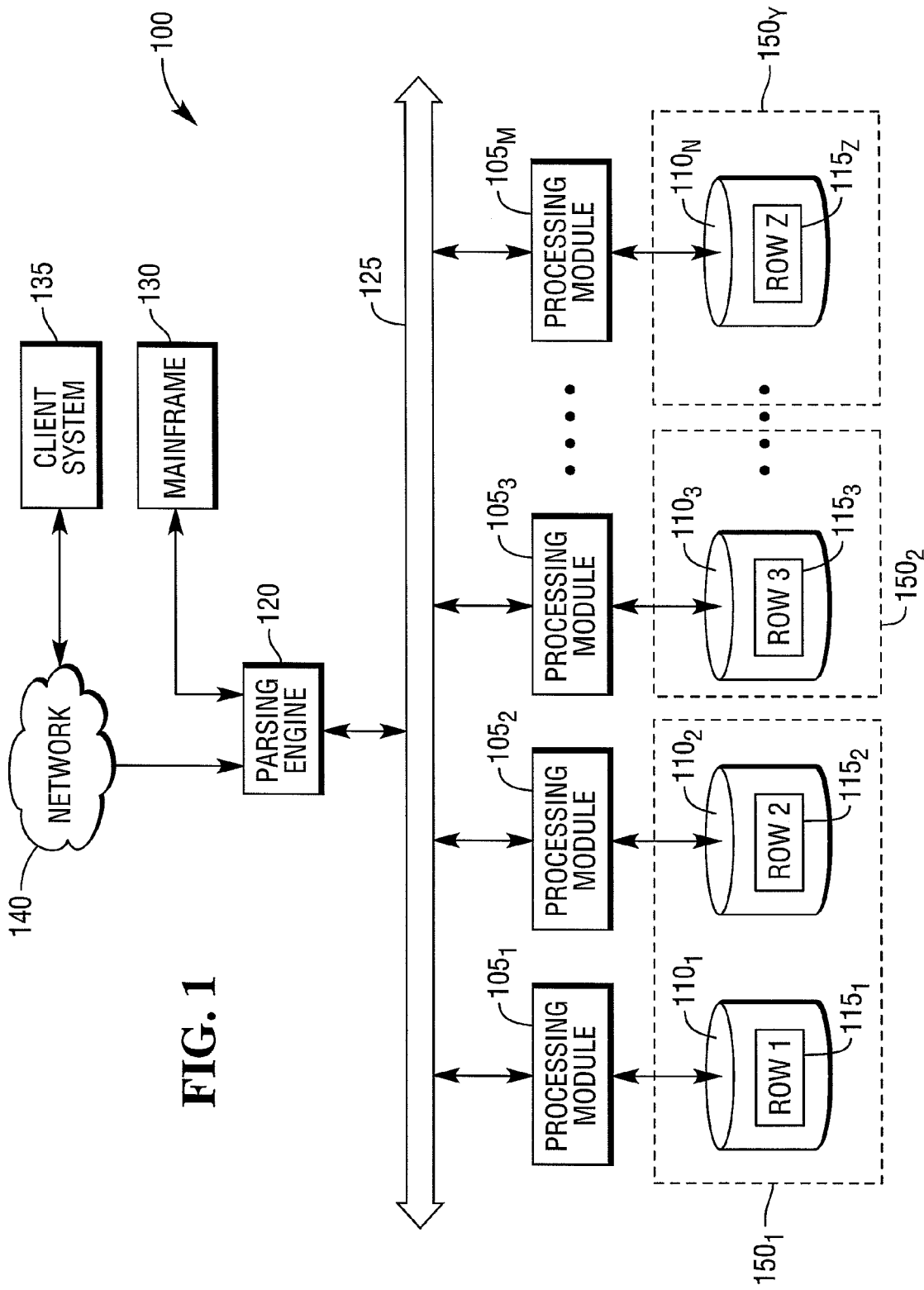
FIG. 1 is a block diagram of an exemplary large computer system in which the techniques described below are implemented.

FIG. 1 shows an example of a database system 100, such as a Teradata Active Data Warehousing System available from NCR Corporation. Database system 100 is an example of one type of computer system in which the techniques of allocating storage are implemented. In computer system 100, vast amounts of data are stored on many disk-storage facilities or devices that are managed by many processing units. In this example the data warehouse 100 includes a Relational Database Management System (RDMS) built upon a Massively Parallel Processing (MPP) platform.

Other types of database systems, such as object-relational database management systems (ORDMS) or those built on symmetric multi-processing (SMP) platforms, are also suited for use here.

The database system 100 includes one or more processing modules $105_{1 \ldots M}$ that manage the storage and retrieval of data in data storage devices $110_{1 \ldots N}$. There does not have to be an equal number of processing modules and data storage devices. Each of the processing modules $105_{1 \ldots M}$ manages a portion of a database that is stored in a corresponding one of the data storage devices $110_{1 \ldots N}$. Each of the data storage devices $110_{1 \ldots N}$ includes one or more disk drives.

The system stores data in one or more tables in the data storage devices $110_{1 \ldots N}$. The rows $115_{1 \ldots Z}$ of the tables are stored across multiple data storage devices $110_{1 \ldots N}$ to ensure that the system workload is distributed evenly across the processing modules $105_{1 \ldots M}$. A parsing engine 120 organizes the storage of data and the distribution of table rows $115_{1 \ldots Z}$ among the processing modules $105_{1 \ldots M}$. The parsing engine 120 also coordinates the retrieval of data from the data storage devices 110₁ ... ₙ over network 125 in response to queries received from a user at a mainframe 130 or a client computer 135 connected to a network 140. The database system 100 usually receives queries and commands in a standard format, such as SQL.

At system configuration time homogeneous sets of identical storage devices are defined. The techniques described below monitor storage device response times to determine the devices that have the fastest response time. The homogeneous sets represent groups of storage devices in which identical storage devices are included in the same homogeneous set. For example, if the database system 100 included 100 36 Gb Seagate model X disk drives in a JBOD configuration and 500 LUNs on EMC model Y arrays, the Seagate drives would form one homogeneous set and the EMC LUNs would form another homogeneous set. A first homogeneous set is represented in FIG. 1 as 150₁. The second homogeneous set is shown as 150₂. Further sets are included through to homogeneous set 150ᵧ. If homogeneous sets are not defined, the technique below simply assumes that each of the storage devices 110₁ ... ₙ form different homogeneous sets and so each storage device is placed in its own homogeneous set. Data representing homogeneous sets and the storage device membership of those sets is typically stored in persistent storage areas separate from the storage that is being allocated.

Figure 2:
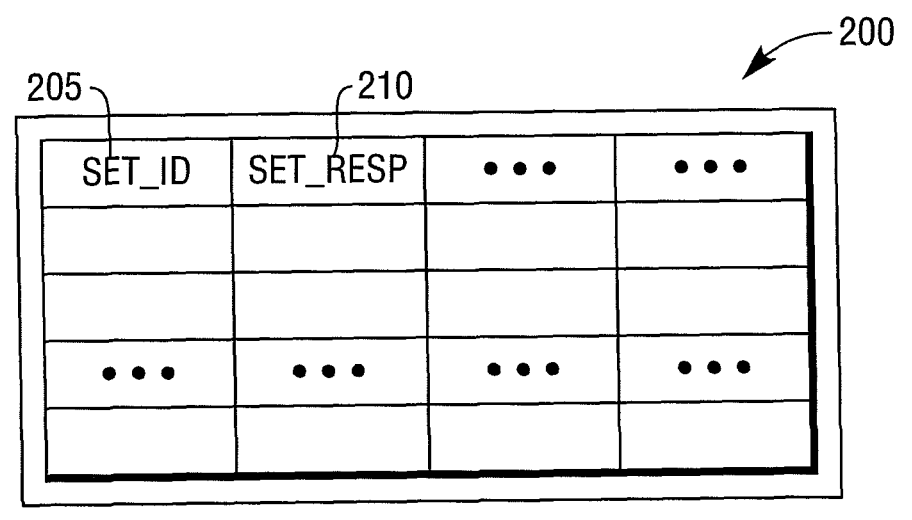

Referring to FIG. 2, the techniques described below maintain in computer memory stored response values 200 associated with at least one of the homogeneous sets. As shown in FIG. 2 the stored response values include at least a homogeneous set identifier 205 that identifies the homogeneous set 150₁ ... ᵧ. The stored response values also include an average response time 210 representing the average response time of the associated homogeneous set under the current I/O workload of the system.

Upon receiving an allocation request, the techniques described locate the homogeneous set 205 with the lowest average response time 210. The storage device within the set is then chosen that has the fewest or lowest current allocations. This process will be described below.

In one preferred form the set identifier 205 and average response time 210 pairs are stored in sorted order to facilitate finding the fastest homogeneous set. An array or table holds the references to the sets in order of increasing response time. The array or table is preferably ordered so that the fastest response time is the first location in the array or table. The techniques described below alter the average response time for individual sets. Each time the average response time for a set is changed, the new average response time is compared to the average response times of the two sets adjacent in the array and any necessary reordering is then effected.

The technique described below maintains a response value and an accumulator for at least one and ideally all of the homogeneous sets. The response value and the accumulator are used to monitor the average response time of each set. In a preferred embodiment of the technique, at least one and preferably two control parameters are also maintained that influence the frequency of recalculation of the response value for each set. The control parameters also influence the result. In the techniques described below the control parameters are c and k.

Figure 3:
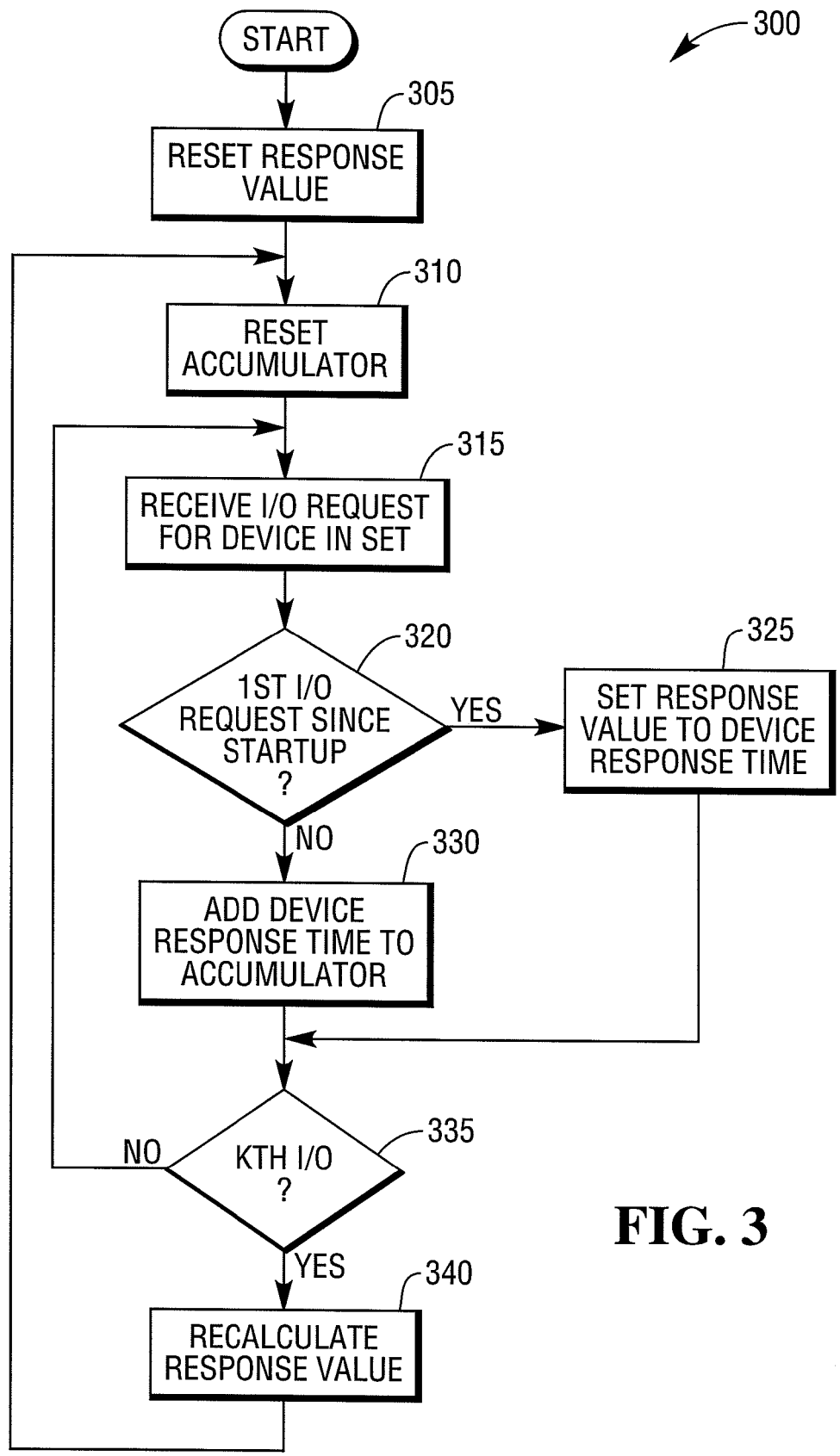
FIG. 3 is a flow chart of a technique for monitoring the response time of a homogeneous set.

FIG. 3 illustrates one technique at 300 of monitoring the response time of a homogeneous set. At system start up time the response value 305 and the accumulator 310 for the homogeneous set are both set to zero. The next step is that an input/output request is received 315. The request is a request for allocation of storage space from a device in the homogeneous set. If 320 the allocation request is the first allocation request to be received by the homogeneous set since system start up then the response value is set to the response time of the device within the homogeneous set that responds to the allocation request 325. The result of this is that when the first I/O request occurs since system start up to a homogeneous set, the response value of the entire set is initially fixed to be that of the I/O response time for the device that satisfies the request. For the first I/O since system start up, the value of the accumulator remains at zero until the second and subsequent I/O requests.

Alternatively, if the first request has already occurred, the response time of the device in milliseconds that satisfies the request is added 330 to the accumulator.

Periodically, the response value is recalculated. In one preferred embodiment a control parameter k is defined. On every kth I/O allocation request, the response value for the homogeneous set is recalculated. Following each I/O request the number of requests is checked to assess whether or not there have been k I/O requests.

If there have been k I/O requests the response value is recalculated 340. The accumulator is reset 310 and the next I/O request is received 315.

The following is one preferred formula for recalculating the response value.

$$\text{response value} = c \cdot \left(\frac{\text{accumulator}}{k}\right) + (1-c) \cdot \text{response value}$$

The response value is essentially recalculated once the number of I/O requests involving a storage device within the homogeneous set, since the previous calculation of the response value, equals a threshold specified by the control parameter k. The response value is recalculated at least partly from the control parameter k and the accumulator. In the above equation the response value is also recalculated at least partly from the previous value of the response value and a further control parameter c.

The above recalculation equation is designed to maintain a running average of measurements of device response time that weights recent events more heavily than past events. It also weights time periods with more I/O requests more heavily than periods with fewer I/O requests. This is desirable because heavy I/O accentuates the effect of workload imbalance on response time. The technique is intended to assist in balancing response time under heavy workloads.

The settings of k and c determine how quickly past response time measurements lose their influence on the recalculated response value.

The value of k is set based on hardware implementation concerns. Calculating a new value using the above formula requires more CPU time than aggregating the accumulator. On this basis a higher k value puts less strain on the CPU. However, setting k too high has the potential to overflow the accumulator or reduce how quickly the response value can incorporate new measurements. It is anticipated that the value of 1000 is a reasonable value for k on most systems.

After k has been set, the control parameter c should be set based on how quickly past response time measurements should lose their influence on the average. A typical value for c is between 0 and 1. Setting a high value of c puts more emphasis on recent measurements. In practice the value of c should be set low enough to smooth out periodic work load fluctuations such as the difference in number of users between nighttime and daytime use, but not so low that fluctuation due to changes in allocation placement take a very long time to propagate into the response value. If it is intended that recent history be the only factor then a typical value for c would be 0.9. On the other hand if it is intended to dampen recent history and be more influenced by past history, a typical value for c would be 0.1. A common value for c in a usual case is 0.3.

Once the response time has been recalculated for a homogeneous set, the response time is updated in the stored response values 200 shown in FIG. 2.

As described above, prior art techniques have the potential to overload slow devices in a heterogeneous configuration that slows down system performance. The new techniques by contrast are intended to perform well on heterogeneous configurations. When all available storage is empty, storage space allocations are placed on the fastest set of homogeneous devices. As this fastest set of devices fills up and bears an increased I/O load, queues form of I/Os waiting to use devices in the previously fastest homogeneous set. This causes an increase in response time on the formerly fastest set of devices.

The techniques described above recognize the above situation. When the once fastest set of devices has longer response times the average response time values for each homogeneous set are adjusted and a new fastest device set emerges. New allocations are placed onto the new fastest device set until increased utilization slows it down also and another set of devices surpasses it. This negative feedback loop keeps the response times on all device sets and all devices approximately equal.

The techniques described above have the potential to perform approximately 25 percent faster over current heterogeneous systems. The technique is also flexible. The technique can be applied to both opaque and non-opaque heterogeneous storage. In other words the solution does not require detailed knowledge about the inner workings of configured devices.

When allocations slow a formerly fast set of devices, news of that slow-down takes time to propagate into the response value average provided that control parameter k is selected appropriately. Old and higher measurements will dominate new and slower measurements for some time. During this time allocations will continue to accumulate on the once faster but now slower devices. This will continue until the average reflects the change in response time. This tendency to push past the point of equilibrium causes oscillations. All the allocations will go on one homogeneous set for a time, then it will switch to another set, and then will switch back to the original set.

Allocation oscillations in the above techniques are mitigated by grouping devices into homogeneous sets. A set of devices experiences change more slowly than does a single device. Oscillations are also less evident in large and mature systems where allocation rates are small compared to the overall amount of data on the system. Also, while keeping in mind that increasing c too greatly allows random workload fluctuations to influence allocation decisions, allocation oscillations can be reduced by decreasing the parameter c that controls how quickly average response time can change.

The text above describes one or more specific embodiments of a broader invention. The invention also is carried out in a variety of alternative embodiments and thus is not limited to those described here. Those other embodiments are also within the scope of the following claims.

We claim:

1. A method of selecting, from a plurality of groups of storage devices within a computer system, a group of storage devices for allocating storage space, the groups of storage devices representing respective homogeneous sets in which storage devices have identical performance are included in a same homogeneous set, the method comprising:
checking one or more stored response values associated with at least one homogeneous set, the stored value(s) representing an average response time of storage devices within the said at least one homogeneous set; and
selecting a homogeneous set with the lowest average response time.

2. The method of claim 1 wherein the stored response value(s) include respective homogeneous set identifiers and average response times.

3. A method of allocating storage space from storage devices within a computer system, the storage devices grouped into respective homogeneous sets in which storage devices have identical performance are included in a same homogeneous set, the method comprising:
receiving an allocation request for storage space,
checking one or more stored response values associated with at least one homogeneous set, the stored value(s) representing an average response time of storage devices within the said at least one homogeneous set;
selecting a homogenous set with the lowest average response time;
checking one or more stored allocation values associated with at least one storage device within the selected homogeneous set, the stored value(s) representing a current allocations of the associated at least one storage device;
selecting a storage device with lowest current allocations; and
allocating storage space in a first available location on the selected storage device.

4. The method of claim 3 wherein the stored response value(s) include respective homogeneous set identifiers and average response times.

5. A method of monitoring a response time of a homogeneous set of storage devices having identical performance within a computer system, the method comprising:
maintaining an accumulator associated with the set;
receiving a request to write to or read from a selected one of the storage devices within the homogeneous set;
adding a response time of the selected device to the accumulator;
periodically calculating a response value at least partly from the accumulator, the response value indicative of the response time of the homogeneous set;
maintaining a control parameter; and
recalculating the response value once a number of requests involving a storage device within the homogeneous set, since a previous calculation of the response value, equals a threshold specified by the control parameter.

6. The method of claim 5 including the step of calculating the response value at least partly from the control parameter and the accumulator.

7. The method of claim 5 further comprising the step of calculating the response value as zero on start up of the computer system.

8. The method of claim 7 further comprising the step of calculating the response value as the response time of the selected device resulting from a first request following start up of the computer system.

9. The method of claim 5 further comprising the step of setting the accumulator to zero on start up of the computer system.

10. The method of claim 9 further comprising the step of setting the accumulator to zero after a first request following start up of the computer system.

11. A computer system, comprising:
a homogeneous set of storage devices having identical performance within said computer system; and
an accumulator associated with the set;
said computer system configured to:
receive a request to write to or read from a selected one of the storage devices within the homogeneous set;
add a response time of the selected device to the accumulator;
periodically calculate a response value at least partly from the accumulator, the response value indicative of a response time of the homogeneous set;
maintain a control parameter; and
recalculate the response value once a number of requests involving a storage device within the homogeneous set, since a previous calculation of the response value, equals a threshold specified by the controlled parameter.

12. The system of claim 11 where the system is configured to calculate the response value at least partly from the controlled parameter and the accumulator.

13. The system of claim 11 further configured to recalculate the response value as zero on start up of the computer system.

14. The system of claim 13 further configured to calculate the response value as the response time of the selected device resulting from a first request following start up of the computer system.

15. The system of claim 11 further configured to set the accumulator to zero on start up of the computer system.

16. The system of claim 15 further configured to set the accumulator to zero after a first request following start up of the computer system.

17. A computer program product including non-transitory storage media comprising executable instructions for performing a method of monitoring a response time of a homogeneous set of storage devices having identical performance within a computer system, the method comprising:
maintaining an accumulator associated with the set;
receiving a request to write to or read from a selected one of the storage devices within the homogeneous set;
adding a response time of the selected device to the accumulator;
periodically calculating a response value at least partly from the accumulator, the response value indicative of the response time of the homogeneous set;
maintaining a control parameter; and
recalculating the response value once a number of requests involving a storage device within the homogeneous set, since a previous calculation of a response value, equals a threshold specified by the control parameter.

18. The computer program product of claim 17, the method including the step of calculating the response value at least partly from the control parameter and the accumulator.

19. The computer program product of claim 17, the method further comprising the step of calculating the response value as zero on start up of the computer system.

20. The computer program product of claim 19, the method further comprising the step of calculating the response value as the response time of the selected device resulting from a first request following start up of the computer system.

21. The computer program product of claim 17, the method further comprising the step of setting the accumulator to zero on start up of the computer system.

22. The computer program product of claim 21, the method further comprising the step of setting the accumulator to zero after a first request following start up of the computer system.

* * * * *